United States Patent
Cao

(10) Patent No.: US 11,631,005 B2
(45) Date of Patent: Apr. 18, 2023

(54) METHOD AND APPARATUS FOR DETECTING SMALL OBJECTS WITH AN ENHANCED DEEP NEURAL NETWORK

(71) Applicant: NOKIA TECHNOLOGIES OY, Espoo (FI)

(72) Inventor: Jiale Cao, Tianjin (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 1159 days.

(21) Appl. No.: 16/303,210

(22) PCT Filed: May 31, 2016

(86) PCT No.: PCT/CN2016/084128
§ 371 (c)(1),
(2) Date: Nov. 20, 2018

(87) PCT Pub. No.: WO2017/206066
PCT Pub. Date: Dec. 7, 2017

(65) Prior Publication Data
US 2020/0184336 A1    Jun. 11, 2020

(51) Int. Cl.
*G06N 3/08*        (2006.01)
*G06K 9/62*        (2022.01)
(Continued)

(52) U.S. Cl.
CPC .......... *G06N 3/084* (2013.01); *G06K 9/6232* (2013.01); *G06K 9/6256* (2013.01); *G06N 3/0454* (2013.01); *G06T 3/40* (2013.01)

(58) Field of Classification Search
CPC .......... G06V 10/82; G06V 40/10; G06T 3/40; G06K 9/6232; G06K 9/6256; G06N 3/084; G06N 3/0454
See application file for complete search history.

(56) References Cited

U.S. PATENT DOCUMENTS 9,008,365 B2    4/2015  Xu et al.
9,202,144 B2    12/2015  Wang et al.
(Continued)

FOREIGN PATENT DOCUMENTS

CN    103279759 A    9/2013
CN    103366180 A    10/2013
(Continued)

OTHER PUBLICATIONS

International Search Report and Written Opinion for Application No. PCT/CN2016/084128 dated Feb. 14, 2017, 6 pages.
(Continued)

*Primary Examiner* — Ross Varndell
(74) *Attorney, Agent, or Firm* — Alston & Bird LLP

(57) ABSTRACT

Various methods are provided for training and subsequently utilizing a convolutional neural network (CNN) to detect small pedestrians (e.g., pedestrians located away a large distance). One example method may comprise performing a first training stage in which a first CNN is trained to detect objects of a first size, the first CNN trained using a first set of images comprised of objects of the first size, and configured to output a first set of parameters, performing a second training stage in which a second CNN is trained using a second set of images, the second set of images comprising objects of a second size, and the first CNN is initialized with the first set of parameters and is re-trained using the second set of images, and determining parameters of the first CNN by minimizing error between the first CNN and the second CNN.

17 Claims, 6 Drawing Sheets

(51) Int. Cl.
*G06N 3/04* (2006.01)
*G06T 3/40* (2006.01)
*G06N 3/084* (2023.01)

(56) References Cited

U.S. PATENT DOCUMENTS

| | | | |
|---|---|---|---|
| 2015/0347831 A1 | 12/2015 | Tamatsu et al. | |
| 2015/0371376 A1* | 12/2015 | Adachi | H04N 5/23296 348/140 |
| 2017/0200063 A1* | 7/2017 | Nariyambut Murali | G06K 9/6274 |
| 2018/0129919 A1* | 5/2018 | Tang | G06V 10/454 |

FOREIGN PATENT DOCUMENTS

| | | |
|---|---|---|
| CN | 104063719 A | 9/2014 |
| CN | 105389584 A | 3/2016 |
| WO | WO 2016/074247 A1 | 5/2016 |

OTHER PUBLICATIONS

Harris, M., *New Pedestrian Detector From Google Could Make Self-Driving Cars Cheaper*, [online] [retrieved Apr. 25, 2019]. Retrieved via the Internet: <URL: http://spectrum.ieee.org/cars-that-think/transportation/self-driving/new-pedestrian-detector-from-google-could-make-selfdriving-cars-cheaper>. (dated May 28, 2015) 3 pages.
Huang, Z., et al., *Latent Training for Convolutional Neural Networks*, 2015 International Conference on Estimation, Detection and Information Fusion (ICEDIF 2015) (dated Jan. 2015) 55-60.
Jiang, X. et al., *Speed Up Deep Neural Network Based Pedestrian Detection by Sharing Features Across Multi-Scale Models*, Neurocomputing 185 (2016) 163-170.
Kira, Z. et al., *Long-Range Pedestrian Detection Using Stereo and a Cascade of Convolutional Network Classifiers*, [online] [retrieved Apr. 25, 2019]. Retrieved via the Internet: <URL: http://zsoltkaira.com/papers/KiraEtAl_IROS2012.pdf>, (dated Oct. 2012) 8 pages.
Li, J. et al., *Scale-Aware Fast r-CNN for Pedestrian Detection*, arXiv: 1510.08160v2 (2015) 9 pages.
Liu, Y-F. et al., *Low Resolution Pedestrian Detection Using Light Robust Features and Hierarchical System*, Pattern Recognition, vol. 47, (2014) 1616-1625.
Park, D. et al., *Multiresolution Models for Object Detection*, Proc. European Conference Computer Vision (2010) 14 pages.
Rajaram, R. N. et al., *Looking at Pedestrians at Different Scales: a Multi-Resolution Approach and Evaluations*, [online] [retrieved Apr. 25, 2019]. Retrieved via the internet: <URL: http://cvrr.ucsd.edu/publications/2016/Nattoji_T_ITS_2016.pdf>. (dated 2016) 12 pages.
Spinello, I. t al., *Detecting Pedestrians at Very Small Scales*, Proc. IEE/RSJ International Conference on Intelligent Robots and Systems (2009) 6 pages.
Varivar, A., *Application of Convoluted Neural Networks for Pedestrian Detection*, [online] [retrieved Apr. 25, 2019]. Retrieved via the Internet: <URL: http://cs231n.stanford.edu/reports2016/254_Report.pdf>, (dated 2016) 7 pages.
Verma, A. et al., *Pedestrian Detection via Mixture of CNN Experts and Thresholded Aggregated Channel Features*, [online] [retrieved Apr. 25, 2019]. Retrieved via the Internet: <URL: http://www.cv-foundation.org/openaccess/content_iccv_2015_workshops/w12/papers/Verma_Pedestrian_Detection_via_ICCV_2015_paper.pdf>. (dated 2015) 163-171.

\* cited by examiner

METHOD AND APPARATUS FOR DETECTING SMALL OBJECTS WITH AN ENHANCED DEEP NEURAL NETWORK

CROSS-REFERENCE TO RELATED APPLICATIONS

The present application is a national phase entry of International Application No. PCT/CN2016/084128, filed May 31, 2016, which is incorporated herein by reference in its entirety.

TECHNOLOGICAL FIELD

Embodiments of the present invention relate generally to a method, apparatus, and computer program product for utilizing an enhanced deep neural network to detect small objects, and more specifically, for utilizing an enhanced deep neural network in detecting distant pedestrians with a self-driving car.

BACKGROUND

Recognizing, tracking, and avoiding human beings is a critical capability in any driverless car. Because of the speed at which a car travels, it is important to detect pedestrians, for example, far enough in advance for the car to change direction, decelerate, or brake. When the pedestrians are located a great distance from the car, pedestrians appear small in an image captured by a camera attached to the car. While many methods have been proposed, the detection performance of small pedestrians is far from satisfying. For example, the miss rate of the conventional method for detecting pedestrians whose size in images is in the range of 30-50 pixels is approximately 80%. Such performance makes self-driving cars very dangerous and thus impractical. One reason for the poor performance in detecting small pedestrians is that the features of a small pedestrian appear blurry making their discrimination from features of non-pedestrian less than obvious.

While the discussion above refers to pedestrians, object detection is important in many other contexts as well. That is, environment perception is of key importance to the success of many automatic systems. For example, robotic grasping is a technological process in which movement may be adjusted as an object becomes nearer.

BRIEF SUMMARY

While deep networks may outperform humans in tasks such as recognizing faces, with accuracy rates of over 99.5 percent, conventional deep networks are slow, often taking seconds or even minutes to analyze an image. This performance makes use of those conventional deep networks less than ideal for identifying objects, for example, while navigating city streets.

A method, apparatus and computer program product are therefore provided according to an example embodiment of the present invention for utilizing an enhanced deep neural network to detect small objects, and more specifically, for utilizing an enhanced deep neural network in detecting distant pedestrians with a self-driving car.

In some embodiments, a method for small object detection may be provided, the method comprising performing a first training stage in which a first convolutional neural network (CNN) is trained to detect objects of a first size, the first CNN trained using a first set of images comprised of objects of the first size, and configured to output a first set of parameters, performing a second training stage in which a second CNN is trained using a second set of images, the second set of images comprising objects of a second size, and the first CNN is initialized with the first set of parameters and is re-trained using the second set of images, and determining parameters of the first CNN by minimizing error between the first CNN and the second CNN.

In some embodiments, the method may further comprise utilizing the first CNN to detect small objects. In some embodiments, the first training stage comprises receiving, as an input, a first set of images, the first set of images comprising objects having a size below a predefined threshold, performing a zoom operation to enlarge the objects to a second predefined size, and using standard back-propagation algorithm to train a first CNN with the images obtained by the enlarging of the objects. In some embodiments, the second stage comprises receiving, as input, a second set of images, the second set of images comprising objects having a size larger than a second predefined threshold, training a N-layer CNN utilizing the second set of images, and re-training the first CNN utilizing the second set of images. In some embodiments, the re-training comprises a pre-processing step of generating a modified second set of images by performing a zoom out operation reducing the size of the objects within the second set of images to a size below the predefined threshold, generating a twice modified second set of images by performing a zoom out operation enlarging the size of the objects to the size larger than the second predefined threshold, and causing input of the twice modified set of images to the first CNN.

In some embodiments, the determination of the parameters of the first CNN further comprises minimizing a mean square error making one or more features extracted by the first CNN and one or more features extracted by the second CNN as close as possible. In some embodiments, an objective function ($f$) of the first CNN is a weighted sum of training error ($E$) and the mean square error ($D$) such that: $f = E + \lambda D$, the mean square error ($D$) measuring a difference between a computational layer or a plurality of computational layers of the first CNN and a corresponding layer or a plurality of corresponding computational layers of the second CNN.

In some embodiments, a computer program product may be provided comprising at least one non-transitory computer-readable storage medium having computer-executable program code instructions stored therein, the computer-executable program code instructions comprising program code instructions for performing a first training stage in which a first convolutional neural network (CNN) is trained to detect objects of a first size, the first CNN trained using a first set of images comprised of objects of the first size, and configured to output a first set of parameters, performing a second training stage in which a second CNN is trained using a second set of images, the second set of images comprising objects of a second size, and the first CNN is initialized with the first set of parameters and is re-trained using the second set of images, and determining parameters of the first CNN by minimizing error between the first CNN and the second CNN.

In some embodiments, the computer-executable program code instructions further comprise program code instructions for utilizing the first CNN to detect small objects In some embodiments, the computer-executable program code instructions for the first training stage further comprise program code instructions for receiving, as an input, a first set of images, the first set of images comprising objects having a size below a predefined threshold, performing a zoom operation to enlarge the objects to a second predefined size, and using standard back-propagation algorithm to train a first CNN with the images obtained by the enlarging of the objects.

In some embodiments, the computer-executable program code instructions for the second training stage further comprise program code instructions for receiving, as input, a second set of images, the second set of images comprising objects having a size larger than a second predefined threshold, training a N-layer CNN utilizing the second set of images, and re-training the first CNN utilizing the second set of images. In some embodiments, the computer-executable program code instructions for the re-training step further comprise program code instructions for a pre-processing step of generating a modified second set of images by performing a zoom out operation reducing the size of the objects within the second set of images to a size below the predefined threshold, generating a twice modified second set of images by performing a zoom out operation enlarging the size of the objects to the size larger than the second predefined threshold, and causing input of the twice modified set of images to the first CNN.

In some embodiments, the computer-executable program code instructions for the determination of the parameters of the first CNN further comprise program code instructions for minimizing a mean square error making one or more features extracted by the first CNN and one or more features extracted by the second CNN as close as possible. In some embodiments, an objective function ($f$) of the first CNN is a weighted sum of training error (E) and the mean square error (D) such that: $f=E+\lambda D$, the mean square error (D) measuring a difference between a computational layer or a plurality of computational layers of the first CNN and a corresponding layer or a plurality of corresponding computational layers of the second CNN.

In some embodiments, an apparatus may be provided, the apparatus comprising at least one processor and at least one memory including computer program code, the at least one memory and the computer program code configured to, with the processor, cause the apparatus to at least perform a first training stage in which a first convolutional neural network (CNN) is trained to detect objects of a first size, the first CNN trained using a first set of images comprised of objects of the first size, and configured to output a first set of parameters, perform a second training stage in which a second CNN is trained using a second set of images, the second set of images comprising objects of a second size, and the first CNN is initialized with the first set of parameters and is re-trained using the second set of images, and determine parameters of the first CNN by minimizing error between the first CNN and the second CNN.

In some embodiments, the at least one memory and the computer program code are further configured to, with the processor, cause the apparatus to utilize the first CNN to detect small objects. In some embodiments, the at least one memory and the computer program code configured to perform the first training stage are further configured to, with the processor, cause the apparatus to receive, as an input, a first set of images, the first set of images comprising objects having a size below a predefined threshold, perform a zoom operation to enlarge the objects to a second predefined size, and use standard back-propagation algorithm to train a first CNN with the images obtained by the enlarging of the objects.

In some embodiments, the at least one memory and the computer program code configured to perform the second training stage are further configured to, with the processor, cause the apparatus to receive, as input, a second set of images, the second set of images comprising objects having a size larger than a second predefined threshold, training a N-layer CNN utilizing the second set of images, and re-train the first CNN utilizing the second set of images. In some embodiments, the at least one memory and the computer program code configured to perform the re-training are further configured to, with the processor, cause the apparatus to perform a pre-processing step of generating a modified second set of images by performing a zoom out operation reducing the size of the objects within the second set of images to a size below the predefined threshold, generate a twice modified second set of images by performing a zoom out operation enlarging the size of the objects to the size larger than the second predefined threshold, and cause input of the twice modified set of images to the first CNN.

In some embodiments, the at least one memory and the computer program code configured for the determination of the parameters of the first CNN are further configured to, with the processor, cause the apparatus to minimize a mean square error making one or more features extracted by the first CNN and one or more features extracted by the second CNN as close as possible. In some embodiments, an objective function ($f$) of the first CNN is a weighted sum of training error (E) and the mean square error (D) such that: $f=E+\lambda D$, the mean square error (D) measuring a difference between a computational layer or a plurality of computational layers of the first CNN and a corresponding layer or a plurality of corresponding computational layers of the second CNN.

In some embodiments, an apparatus configured to utilize an enhanced deep neural network to detect small objects may be provided, the apparatus comprising means for performing a first training stage in which a first convolutional neural network (CNN) is trained to detect objects of a first size, the first CNN trained using a first set of images comprised of objects of the first size, and configured to output a first set of parameters, means for performing a second training stage in which a second CNN is trained using a second set of images, the second set of images comprising objects of a second size, and the first CNN is initialized with the first set of parameters and is re-trained using the second set of images, and determining parameters of the first CNN by minimizing error between the first CNN and the second CNN.

In some embodiments, the apparatus may further comprise means for utilizing the first CNN to detect small objects. In some embodiments, the means for performing first training stage comprises means for receiving, as an input, a first set of images, the first set of images comprising objects having a size below a predefined threshold, means for performing a zoom operation to enlarge the objects to a second predefined size, and means for using standard back-propagation algorithm to train a first CNN with the images obtained by the enlarging of the objects. In some embodiments, the means for performing the second stage comprises means for receiving, as input, a second set of images, the second set of images comprising objects having a size larger than a second predefined threshold, means for training a N-layer CNN utilizing the second set of images, and means for re-training the first CNN utilizing the second set of images.

In some embodiments, the means for re-training comprises means for performing a pre-processing step of generating a modified second set of images by performing a zoom out operation reducing the size of the objects within the second set of images to a size below the predefined threshold, means for generating a twice modified second set of images by performing a zoom out operation enlarging the size of the objects to the size larger than the second predefined threshold, and means for causing input of the twice modified set of images to the first CNN.

In some embodiments, the means for determining the parameters of the first CNN further comprises means for minimizing a mean square error making one or more features extracted by the first CNN and one or more features extracted by the second CNN as close as possible. In some embodiments, an objective function ($f$) of the first CNN is a weighted sum of training error (E) and the mean square error (D) such that: $f=E+\lambda D$, the mean square error (D) measuring a difference between a computational layer or a plurality of computational layers of the first CNN and a corresponding layer or a plurality of corresponding computational layers of the second CNN.

BRIEF DESCRIPTION OF THE DRAWINGS

Figure 1:
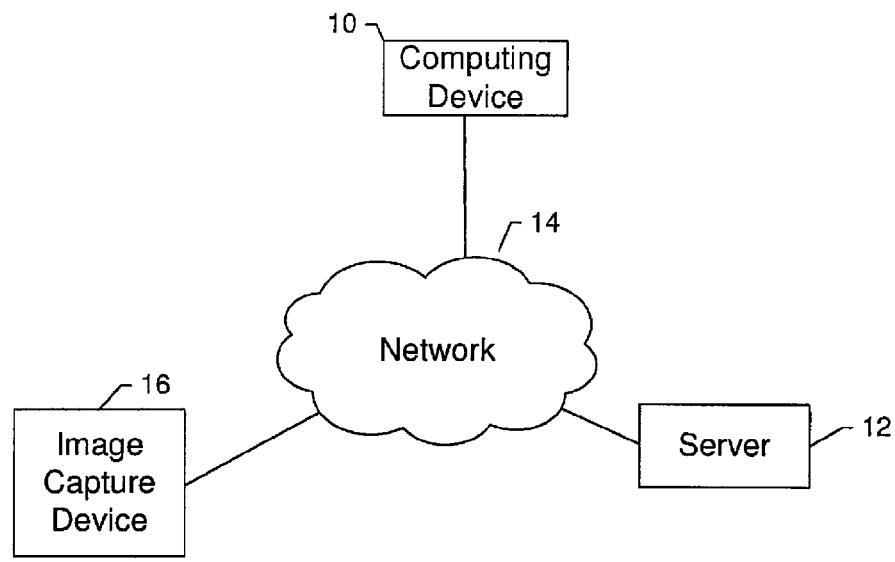
Figure 2:
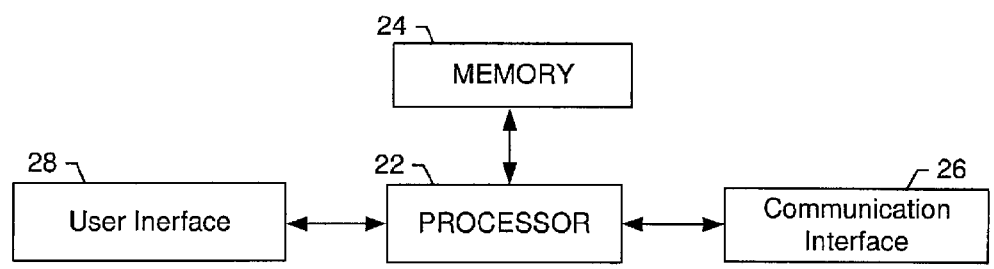
Figure 3:
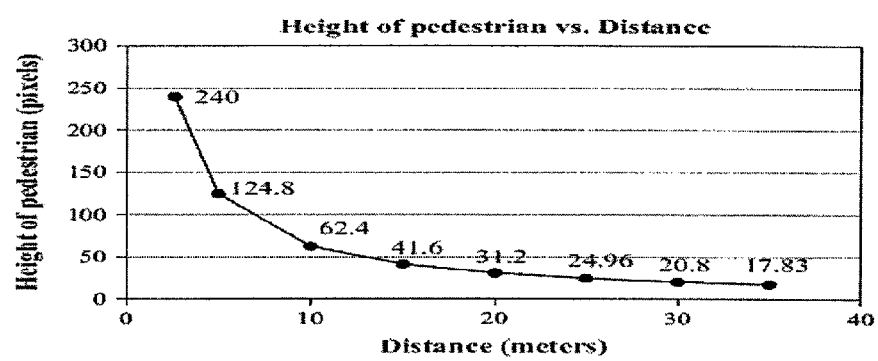
Figure 4:
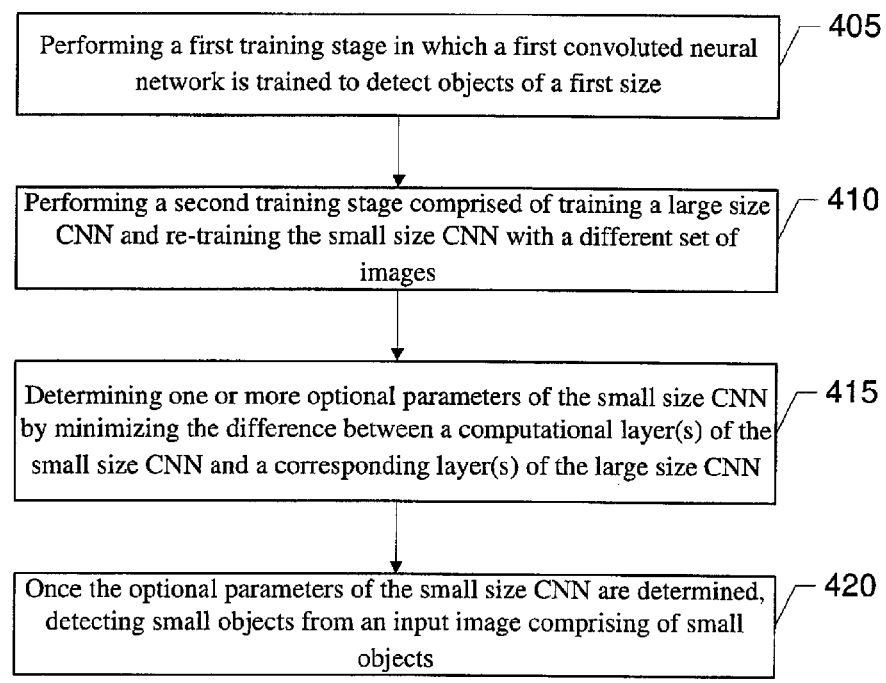
Figure 5:
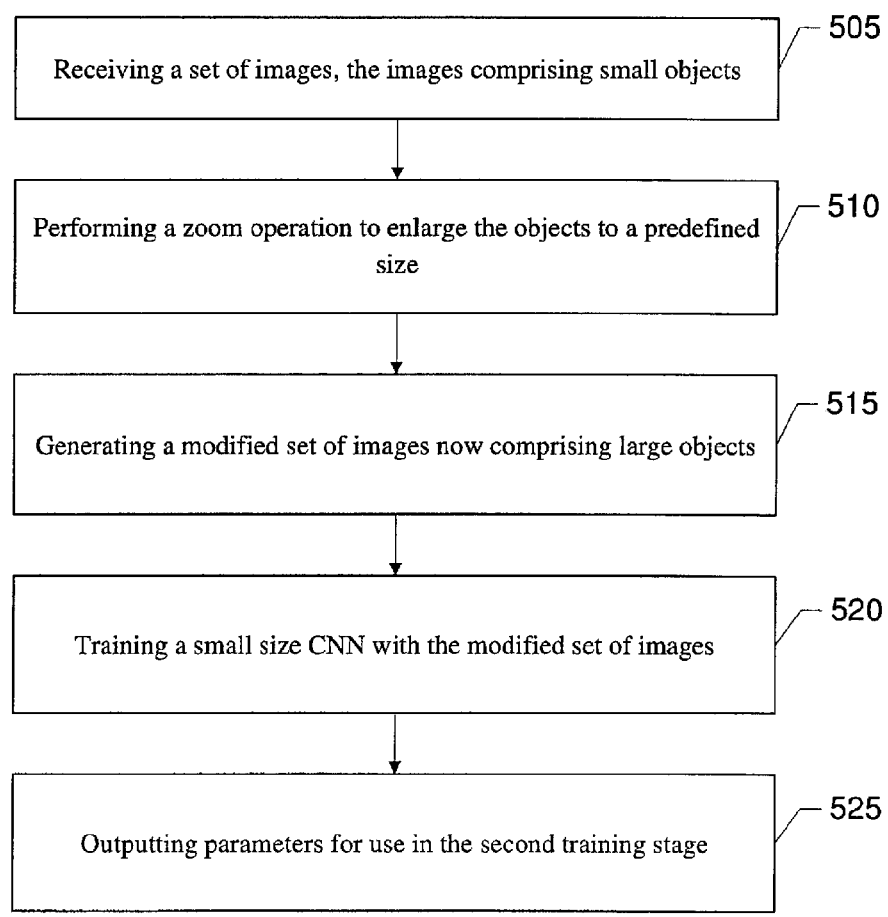
Figure 6:
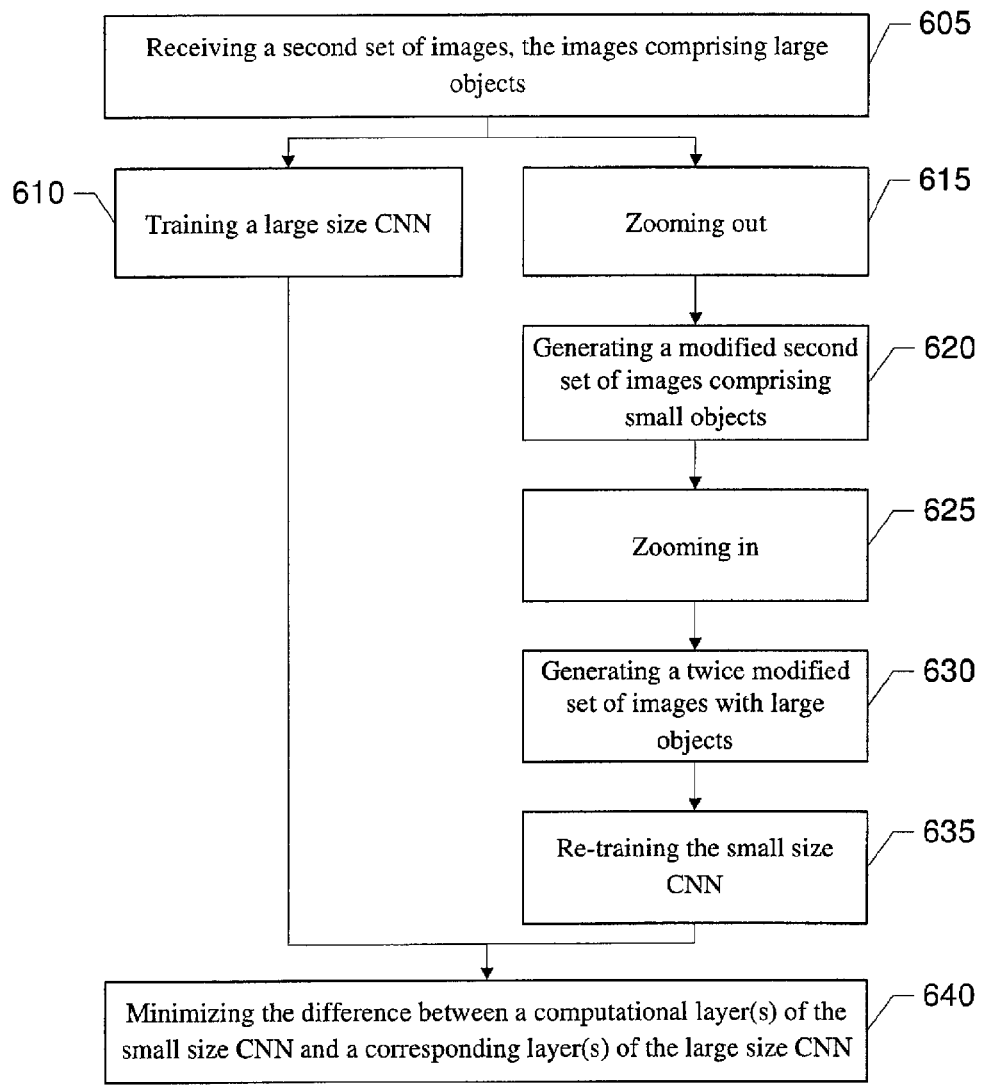
Figure 7A:
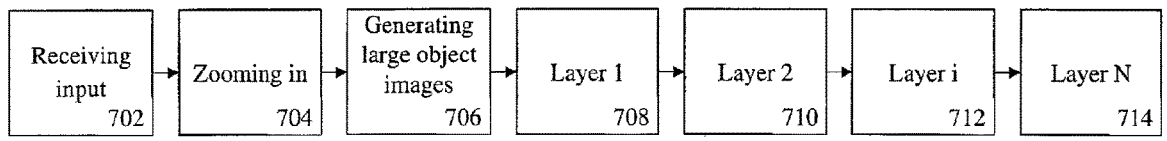
Figure 7B:
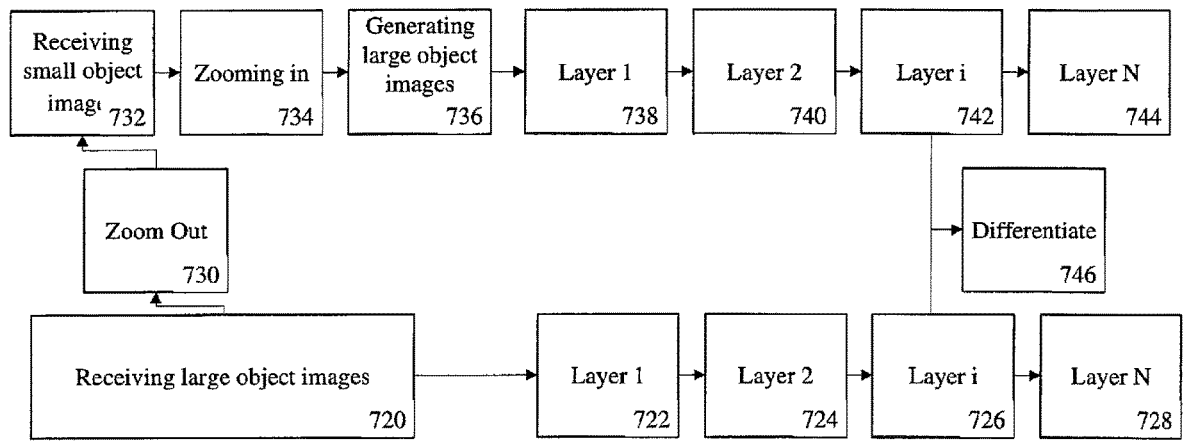
Figure 7C:
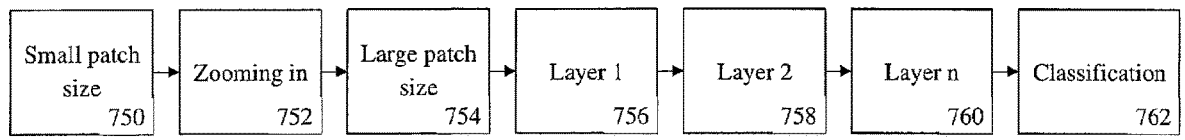

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is a graph showing the inverse relationship between the height of a pedestrian in pixels to distance;

FIG. 4 is an example flowchart illustrating a method of operating an example apparatus in accordance with an embodiment of the present invention;

FIG. 5 is an example flowchart illustrating a method of operating an example apparatus in accordance with an embodiment of the present invention;

FIG. 6 is an example flowchart illustrating a method of operating an example apparatus in accordance with an embodiment of the present invention; and FIGS. 7A, 7B, and 7C shows example data flow diagrams illustrating a method of operating an example apparatus in accordance with an embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

Referring now of FIG. 1, a system that supports communication, either wirelessly or via a wireline, between a computing device 10 and a server 12 or other network entity (hereinafter generically referenced as a "server") is illustrated. As shown, the computing device and the server may be in communication via a network 14, such as a wide area network, such as a cellular network or the Internet, or a local area network. However, the computing device and the server may be in communication in other manners, such as via direct communications between the computing device and the server.

The computing device 10 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. The image capture device 16 may be embodied by or affixed to or a component of, for example, a mobile device. The server 12 may be embodied by a computing device and, in one embodiment, is embodied by a web server. Additionally, while the system of FIG. 1 depicts a single server, the server may be comprised of a plurality of servers which may collaborate to support browsing activity conducted by the computing device.

Regardless of the type of device that embodies the computing device 10, the computing device may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

Detecting Objects

In an example embodiment of the present invention, an apparatus or computer program product may be provided to implement or execute a method, process, or algorithm for utilizing an enhanced deep neural network to detect small objects, and more specifically, for utilizing an enhanced deep neural network in detecting distant pedestrians with a self-driving car.

FIG. 3 is a graph showing the inverse relationship between the heights of pedestrians in pixels to distance from an image capture device, for example, that may be affixed to a car. Accordingly, as used herein, the term "small" in reference to objects within an image may refer to distant objects. Because the speed of a car is usually very high, it is important to detect pedestrians in advance, for example, while they are at a greater distance from a car than the braking distance (i.e. the distance required for a car to stop) allowing the car has enough time to make correct operations (e.g., deceleration or brake). As described above, though many methods have been proposed, no method for detecting small objects satisfies, for example, the requirement that an object must be detected while it is further from the car than the distance required to stop the car. That is, the miss rate of the conventional methods is about 80% for detecting pedestrians whose size in images is in the range of 30-50 pixels. The reason for such a high miss rate may be that the features of, for example, small pedestrians are blurry making discrimination from the features of a non-pedestrian difficult.

FIGS. 4-6 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 4-6, when executed, convert a computer or processing circuitry into a particular machine configured to perform an example embodiment of the present invention. Accordingly, the operations of FIGS. 4-6 define an algorithm for configuring a computer or processing to perform an example embodiment. In some cases, a general purpose computer may be provided with an instance of the processor which performs the algorithms of FIGS. 4-6 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included as shown by the blocks having a dashed outline in FIGS. 4-6. It should be appreciated that each of the modifications, optional additions or amplifications below may be included with the operations above either alone or in combination with any others among the features described herein.

In some example embodiments, a method, apparatus and computer program product may be configured for utilizing an enhanced deep neural network to detect small objects, and more specifically, for utilizing an enhanced deep neural network in detecting distant pedestrians with a self-driving car.

While a convolutional neural network (CNN) may be used in image classification, conventional techniques using CNNs are used in detecting relatively large objects. Due to the context of the present invention (e.g., determination of the presence of particular objects from images captured from a moving car), conventional techniques using CNNs cannot themselves be used for the purpose of detecting pedestrians. That is, to detect objects larger than a pre-defined size, a large-size CNN and/or a middle-size CNN may be trained. The large-size CNN is any conventional CNN whose training data is images comprising objects larger than the pre-defined size. Similarly, a middle-size CNN is any conventional CNN whose training data is images of objects falling with a pre-defined size range. As such, one or ordinary skill would appreciate that while training a CNN is known, conventional methods are not useful nor applicable to detecting, identifying, or classifying distant objects, those objects being smaller than a pre-defined size in a captured image. One of ordinary skill will also appreciate that CNNs are comprised of several computational layers (i.e., convolutional layers and pooling layers).

To detect objects smaller than a pre-defined size (e.g., such as pedestrians located at a distance such that they show up smaller than the pre-defined size, in pixels, in a captured image), a small-size CNN framework enhanced by the large-size CNN is provided. The enhancement makes the computational layers of the small-size CNN approach the computational layers of the large-size CNN. This strategy makes the detection accuracy of small-size pedestrians approach that of the large-size pedestrians in the sense of feature extraction and classification. In the testing stage, only the enhanced small-size network is used. As such, a method for utilizing an enhanced deep neural network to detect small objects, and more specifically, for utilizing an enhanced deep neural network in detecting distant pedestrians with a self-driving car is provided.

FIG. 4 is an example flowchart illustrating a method for detecting small or distant objects, in accordance with an embodiment of the present invention. As shown in block 405 of FIG. 4, an apparatus, such as apparatus 20 may be configured to perform a first training stage in which a first convolutional neural network is trained to detect objects of a first size. The apparatus 20 may therefore include means, such as the processor 22 or the like, for performing a first training stage in which a first convolutional neural network is trained to detect objects of a first size. In some embodiments, the first CNN is trained using a first set of images comprised of objects of the first size, and configured to output a first set of parameters. In some embodiments, the set of first images may comprise objects having a size below a predefined threshold. Block 405 is further discussed with reference to FIG. 5.

As shown in block 410 of FIG. 4, an apparatus, such as apparatus 20 may be configured to perform a second training stage in which a second CNN is trained using a second set of images. The apparatus 20 may therefore include means, such as the processor 22 or the like, for performing a second training stage in which a second CNN is trained using a second set of images. In some embodiments, the second set of images may comprise objects of a second size, and the first CNN is initialized with the parameters of the first CNN and is re-trained using the second set of images. In some embodiments, the second set of images comprises objects having a size larger than a second predefined threshold or simply larger than the objects of the first size. Block 410 is further discussed with reference to FIG. 6.

During the training phase, a CNN automatically learns the values of its filters based on the requested task (e.g., identifying the presence of a particular object, such as a person, in an image). For example, in image classification, a CNN may learn to detect edges from raw pixels in the first layer, then use the edges to detect simple shapes in the second layer, and then use these shapes to detect higher-level features, such as body shapes or the like in higher layers. The last layer may then be used as a classifier that is configured to use the high-level features.

As shown in block 415 of FIG. 4, an apparatus, such as apparatus 20 may be configured to determine parameters of the first CNN by minimizing error between the first CNN and the second CNN. The apparatus 20 may therefore include means, such as the processor 22 or the like, for determining parameters of the first CNN by minimizing error between the first CNN and the second CNN. In some embodiments, the apparatus may be configured for determining one or more optional parameters of the small size CNN by minimizing the difference between a computational layer(s) of the small size CNN and a corresponding layer(s) of the large size CNN.

In some embodiments, an objective function $f$ of the small-size CNN is a weighted sum of training error E and the mean square error D: $f=E+\lambda D$. The mean square error D measures the difference between a computational layer or several computational layers of the small-size CNN and a corresponding layer (or several computational lays) of the large-size CNN. The apparatus may be configured to minimize the mean square error making the features extracted by the small-size and the features extracted by the large-size images as close as possible.

Once the optional parameters of the small size CNN are determined, as shown in block 420 of FIG. 4, an apparatus, such as apparatus 20 may be configured to detect small objects from an input image comprising of small objects. The apparatus 20 may therefore include means, such as the processor 22 or the like, for detect small objects from an input image comprising of small objects.

FIG. 5 shows an example flowchart illustrating a method for performing a first training stage, in accordance with an embodiment of the present invention. As shown in block 505 of FIG. 5, an apparatus, such as apparatus 20 may be configured to receive, as an input, a set of first images, the set of first images comprising objects having a size below a predefined threshold. The apparatus 20 may therefore include means, such as the processor 22 or the like, for receiving, as an input, a set of first images, the set of first images comprising objects having a size below a predefined threshold.

As shown in block 510 of FIG. 5, an apparatus, such as apparatus 20 may be configured to perform a zoom operation to enlarge the objects to a second predetermined size. The apparatus 20 may therefore include means, such as the processor 22 or the like, for performing a zoom operation to enlarge the objects to a second predetermined size. As shown in block 515 of FIG. 5, an apparatus, such as apparatus 20 may be configured to generate a modified set of images comprising large objects. The apparatus 20 may therefore include means, such as the processor 22 or the like, for generating a modified set of images comprising large objects.

As shown in block 520 of FIG. 5, an apparatus, such as apparatus 20 may be configured to train a small size CNN with the modified set of images. The apparatus 20 may therefore include means, such as the processor 22 or the like, for training a small size CNN with the modified set of images. For example, in some embodiments, the apparatus may be configured for using a standard back-propagation algorithm to train a first (e.g., small-size) CNN with the images obtained by the resizing (e.g., via the zoom operation) of the small objects. As shown in block 525 of FIG. 5, an apparatus, such as apparatus 20 may be configured to output parameters, for example, for use in the second training stage. The apparatus 20 may therefore include means, such as the processor 22 or the like, for outputting parameters for use in the second training stage.

FIG. 6 shows is an example flowchart illustrating a method for performing a second training stage, in accordance with an embodiment of the present invention. As shown in block 605 of FIG. 6, an apparatus, such as apparatus 20 may be configured to receive, as input, a second set of images, the second set of images comprising objects having a size larger than a second predefined threshold. The apparatus 20 may therefore include means, such as the processor 22 or the like, for receiving, as input, a second set of images, the second set of images comprising objects having a size larger than a second predefined threshold.

Once the images comprising, for example, the large objects are received, the images are used to train both a large size CNN, for example, in a conventional method and independently train or re-train the small size CNN. As shown in block 610 of FIG. 6, an apparatus, such as apparatus 20 may be configured to train an N-layer CNN. The apparatus 20 may therefore include means, such as the processor 22 or the like, for training an N-layer CNN, for example, using a conventional CNN learning algorithm. In parallel with block 610, the apparatus may be configured to re-train the small size CNN, for example, from FIG. 5 with, for example, images comprising small objects, for example, utilizing the output of the first training stage as the initial parameters. To do this, as shown in block 615 of FIG. 6, an apparatus, such as apparatus 20 may be configured to perform a zoom operation (e.g., zoom out) reducing the size of the objects in the second set of images to objects to a pre-defined size. The apparatus 20 may therefore include means, such as the processor 22 or the like, for performing a zoom out operation.

Once the zoom operation is performed, the images and/or objects have been reduced in size. As shown in block 620 of FIG. 6, an apparatus, such as apparatus 20 may be configured to generate a modified second set of images, the images now comprising small objects. The apparatus 20 may therefore include means, such as the processor 22 or the like, for generating a modified second set of images. As shown in block 625 of FIG. 6, an apparatus, such as apparatus 20 may be configured to perform a second zoom operation (e.g., zoom in) enlarging the size of the objects in the second set of images. The apparatus 20 may therefore include means, such as the processor 22 or the like, for performing a zoom in operation.

As shown in block 630 of FIG. 6, an apparatus, such as apparatus 20 may be configured to generate a twice modified set of images. The apparatus 20 may therefore include means, such as the processor 22 or the like, for generating a twice modified set of images, the twice modified set of images now comprising large objects. In some embodiments, the zoom in operation and resulting images may comprise, for example, blurry large object and/or blurry images comprising large objects. As shown in block 635 of FIG. 6, an apparatus, such as apparatus 20 may be configured to re-train the small size CNN. The apparatus 20 may therefore include means, such as the processor 22 or the like, for re-training the small size CNN, for example, using the twice-modified set of images.

Once both the large size CNN has been trained using the large objects and the small size CNN has been trained/re-trained using the large objects that were, for example, reduced in size via a zoom in operation and subsequently enlarged via a zoom out operation, the parameters of the small size CNN are determined, for example, by minimizing the difference between a computational layer(s) of the small size CNN and a corresponding layer(s) of the large size CNN.

FIGS. 7A-7C shows example data flow diagrams illustrating a method of operating an example apparatus in accordance with an embodiment of the present invention.

Suppose there are N computational layers in both small-size CNN and large-size CNN. The proposed method consists of two training stages (see FIGS. 7A and 7B). In the first training stage (i.e., FIG. 7A), at step 702, an input is received, the input being an image set, for example, comprising actual (versus zoomed in or zoomed out) images of objects (e.g., an object to be detected by the CNN (i.e. pedestrians)) having a size smaller than a pre-defined threshold (hereinafter, "small objects"). The small object images are then subjected to zoom in operation, at step 704, to generate, at step 706, images comprising objects having a size larger than the pre-defined threshold. As described above, in image classification, a CNN may learn to detect edges from raw pixels in the first layer, for example, at step 708, then use the edges to detect simple shapes in the second layer, for example, at step 710, and then use these shapes to detect higher-level features, for example, at 712, such as body shapes or the like in higher layers. The last layer, for example, at step 714, may then be used as a classifier that is configured to utilize the high-level features.

In some embodiments, the first training stage may use a standard back-propagation algorithm to train a small-size CNN with the image set generated by resizing the images comprising small-size pedestrians to images comprising large size pedestrians. The parameters of the small-size CNN in FIG. 7A may then be used to initialize the parameters of the small-size CNN in the second training stage, for example, shown in FIG. 7B. The small-size CNN in the second training stage may then be trained with the small-size images obtained after performance of a zoom out operation on the images comprising the large objects (e.g., actual (as opposed to zoomed in or zoomed out) objects (e.g., pedestrians)). Once the small size CNN is trained and the large size CNN is trained, the small-size CNN may be enhanced by the large-size CNN.

Referring now to FIG. 7B, at step 720, a second set of images is received, the images comprising the objects having a size larger than the pre-defined threshold. Given the second set of images, a large size CNN is trained and the small size CNN is trained/retrained. As shown in steps 722, 724, 726, and 728, an N-layer large-size CNN may be trained, for example, using a CNN learning algorithm. That is, an N-layer large-size CNN may learn to first detect edges from raw pixels in the first layer, for example, at step 722, then use the edges to detect simple shapes in the second layer, for example, at step 724, and then use these shapes to detect higher-level features, for example, at 726, such as body shapes or the like in higher layers. The last layer, for example, at step 728, may then be used as a classifier that is configured to utilize the high-level features.

In parallel with the training of the N-layer large-size CNN, and utilizing the output parameters of the small size CNN from FIG. 7A, the small-size CNN may be re-trained. As shown in FIG. 7B, in step 730, the second set of images is subjected to a zoom out operation, reducing the size of the objects shown therein. The modified second set of images is then received, as input, at the small size CNN. That is, the input being the resized version of the large-size images. At step 734, the modified second set of images are subjected to a zoom in operation. At step 736, due to the modified second set of images being subjected to the zoom in operation, a twice modified second set of images is generated, the twice modified second set of images now comprised of objects that were initially large, then were reduced via the zoom in operation of step 730, and then were enlarged via the zoom in operation of 734. Using the twice modified second set of images, the small size CNN is trained/retrained. That is, for example, an N-layer small size CNN may learn to first detect edges from raw pixels in the first layer, for example, at step 738, then use the edges to detect simple shapes in the second layer, for example, at step 740, and then use these shapes to detect higher-level features, for example, at 742, such as body shapes or the like in higher layers. The last layer, for example, at step 744, may then be used as a classifier that is configured to utilize the high-level features.

Once the small size CNN is trained and the large size CNN is trained, as shown in step 746, the optimal parameters of the small-size CNN may be obtained, for example, by minimizing the objective function with a back-propagation algorithm. In some embodiments, the objective function $f$ of the small-size CNN is a weighted sum of training error E and the mean square error D: $f=E+\lambda D$. The mean square error D may measure the difference between a computational layer (or several computational layers) of the small-size CNN and a corresponding layer or several computational lays of the large-size CNN. FIG. 7B shows a possible square error $D=D_i$ with $D_i$ being the difference between layer i of the small-size CNN and layer i of the large-size CNN. In some embodiments, the optimal parameters of the small-size CNN may be obtained by minimizing the objective function with a back-propagation algorithm. Minimizing the mean square error may make the features extracted by the small-size and the features extracted by the large-size images as close as possible, which may significantly enhance the small-size CNN and improve the performance of detecting small objects.

Once the parameters of the small-size CNN are obtained by the training stages, the small-size CNN may be used, for example, to detect small objects (e.g., small pedestrians). Specifically, the testing stage is shown in FIG. 7C. First, as shown in step 750, input is received, the input being a small patch. To detect whether or not there exists a small pedestrian in the small patch, as shown in step 752, the small patch is subjected to a zoom in operation, the zoom in operation making the size of the small patch equal or nearly equal to that of the large-size image used in FIG. 7B, thus generating a large size patch, as shown in step 754. Subsequently, the large size patch is input into the small size CNN generated in FIG. 7B. In particular, for example, the N-layer small size CNN may receive the patch, learn to first detect edges from raw pixels in the first layer, for example, at step 7756, then use the edges to detect simple shapes in the second layer, for example, at step 758, and then use these shapes to detect higher-level features, for example, at 760, such as body shapes or the like in higher layers. The last layer, for example, at step 762, may then be used to classify whether a small object (e.g., a small pedestrian) is present in the large patch. As such, utilizing the enhanced small size CNN, for example, from FIG. 7B, an image comprising distant objects (i.e., objects further than the stopping distance of a car), for example, taken from an image capture device on a self-driving car, may be classified as to whether a pedestrian is present.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims Although specific terms are employed herein, they are used in a generic and descriptive sense only and not for purposes of limitation.

What is claimed is:

1. A method for object detection, the method comprising:
    performing a first training stage in which a first convolutional neural network (CNN) is trained to detect objects of a first size having a first relationship with a predefined threshold, the first CNN trained using a first set of images comprised of objects of the first size, and configured to output a first set of parameters;
    performing a second training stage in which a second CNN is trained using a second set of images, the second set of images comprising objects of a second size having a second relationship, different than the first relationship, with the predefined threshold, and the first CNN is initialized with the first set of parameters and is re-trained using the second set of images; and
    determining parameters of the first CNN by reducing a mean square error making one or more features extracted by the first CNN and one or more features extracted by the second CNN closer to each other.

2. The method according to claim 1, further comprising: utilizing the first CNN to detect small objects.

3. The method according to claim 1, wherein the first training stage comprises
    receiving, as an input, a first set of images, the first set of images comprising objects having a size below a predefined threshold;
    performing a zoom operation to enlarge the objects to a second predefined size; and
    using standard back-propagation algorithm to train a first CNN with the images obtained by the enlarging of the objects.

4. The method according to claim 1, wherein the second stage comprises:
    receiving, as input, a second set of images, the second set of images comprising objects having a size larger than a second predefined threshold;
    training a N-layer CNN utilizing the second set of images; and
    re-training the first CNN utilizing the second set of images.

5. The method according to claim 1, wherein the re-training comprises:
    a pre-processing step of generating a modified second set of images by performing a zoom out operation reducing the size of the objects within the second set of images to a size below the predefined threshold;
    generating a twice modified second set of images by performing a zoom out operation enlarging the size of the objects to the size larger than the second predefined threshold; and
    causing input of the twice modified set of images to the first CNN.

6. The method according to claim 1, wherein an objective function ($f$) of the first CNN is a weighted sum of training error (E) and the mean square error (D) such that $f=E+\lambda D$, the mean square error (D) measuring a difference between a computational layer or a plurality of computational layers of the first CNN and a corresponding layer or a plurality of corresponding computational layers of the second CNN.

7. A computer program product comprising at least one non-transitory computer-readable storage medium having computer-executable program code instructions stored therein, the computer-executable program code instructions comprising program code instructions for:
    performing a first training stage in which a first convolutional neural network (CNN) is trained to detect objects of a first size having a first relationship with a predefined threshold, the first CNN trained using a first set of images comprised of objects of the first size, and configured to output a first set of parameters;
    performing a second training stage in which a second CNN is trained using a second set of images, the second set of images comprising objects of a second size having a second relationship, different than the first relationship, with the predefined threshold, and the first CNN is initialized with the first set of parameters and is re-trained using the second set of images; and
    determining parameters of the first CNN by reducing a mean square error making one or more features extracted by the first CNN and one or more features extracted by the second CNN closer to each other.

8. The computer program product according to claim 7, wherein the computer-executable program code instructions further comprise program code instructions for:
    utilizing the first CNN to detect small objects.

9. The computer program product according to claim 7, wherein the computer-executable program code instructions for the first training stage further comprise program code instructions for:
    receiving, as an input, a first set of images, the first set of images comprising objects having a size below a predefined threshold;
    performing a zoom operation to enlarge the objects to a second predefined size; and
    using standard back-propagation algorithm to train a first CNN with the images obtained by the enlarging of the objects.

10. The computer program product according to claim 7, wherein the computer-executable program code instructions for the second training stage further comprise program code instructions for:

receiving, as input, a second set of images, the second set of images comprising objects having a size larger than a second predefined threshold;

training a N-layer CNN utilizing the second set of images; and re-training the first CNN utilizing the second set of images.

11. The computer program product according to claim 7, wherein the computer-executable program code instructions for the retraining step further comprise program code instructions for:

a pre-processing step of generating a modified second set of images by performing a zoom out operation reducing the size of the objects within the second set of images to a size below the predefined threshold;

generating a twice modified second set of images by performing a zoom out operation enlarging the size of the objects to the size larger than the second predefined threshold; and causing input of the twice modified set of images to the first CNN.

12. The computer program product according to claim 7, wherein an objective function ($f$) of the first CNN is a weighted sum of training error (E) and the mean square error (D) such that: $f=E+\lambda D$, the mean square error (D) measuring a difference between a computational layer or a plurality of computational layers of the first CNN and a corresponding layer or a plurality of corresponding computational layers of the second CNN.

13. An apparatus comprising at least one processor and at least one memory including computer program code, the at least one memory and the computer program code configured to, with the processor, cause the apparatus to at least:

perform a first training stage in which a first convolutional neural network (CNN) is trained to detect objects of a first size having a first relationship with a predefined threshold, the first CNN trained using a first set of images comprised of objects of the first size, and configured to output a first set of parameters;

perform a second training stage in which a second CNN is trained using a second set of images, the second set of images comprising objects of a second size having a second relationship, different than the first relationship, with the predefined threshold, and the first CNN is initialized with the first set of parameters and is re-trained using the second set of images; and determine parameters of the first CNN by reducing a mean square error making one or more features extracted by the first CNN and one or more features extracted by the second CNN closer to each other.

14. The apparatus according to claim 13, wherein the at least one memory and the computer program code are further configured to, with the processor, cause the apparatus to:

utilize the first CNN to detect small objects.

15. The apparatus according to claim 13, wherein the at least one memory and the computer program code configured to perform the first training stage are further configured to, with the processor, cause the apparatus to:

receive, as an input, a first set of images, the first set of images comprising objects having a size below a predefined threshold;

perform a zoom operation to enlarge the objects to a second predefined size; and use standard back-propagation algorithm to train a first CNN with the images obtained by the enlarging of the objects.

16. The apparatus according to claim 13, wherein the at least one memory and the computer program code configured to perform the second training stage are further configured to, with the processor, cause the apparatus to:

receive, as input, a second set of images, the second set of images comprising objects having a size larger than a second predefined threshold;

train a N-layer CNN utilizing the second set of images; and re-train the first CNN utilizing the second set of images.

17. The apparatus according to claim 13, wherein the at least one memory and the computer program code configured to perform the re-training are further configured to, with the processor, cause the apparatus to:

perform a pre-processing step of generating a modified second set of images by performing a zoom out operation reducing the size of the objects within the second set of images to a size below the predefined threshold;

generate a twice modified second set of images by performing a zoom out operation enlarging the size of the objects to the size larger than the second predefined threshold; and cause input of the twice modified set of images to the first CNN.

* * * * *

UNITED STATES PATENT AND TRADEMARK OFFICE
CERTIFICATE OF CORRECTION

PATENT NO. : 11,631,005 B2  
APPLICATION NO. : 16/303210  
DATED : April 18, 2023  
INVENTOR(S) : Jiale Cao Page 1 of 1

It is certified that error appears in the above-identified patent and that said Letters Patent is hereby corrected as shown below:

In the Claims

In Column 15, Line 66, Claim 4, delete "according claim" and insert -- according to claim --, therefor.

In Column 16, Line 23, Claim 6, delete "such that $f=E+\lambda D$," and insert -- such that: $f=E+\lambda D$, --, therefor.

Signed and Sealed this  
Twenty-fifth Day of July, 2023

Katherine Kelly Vidal  
*Director of the United States Patent and Trademark Office*